(12) United States Patent
Scott et al.

(10) Patent No.: US 7,806,274 B2
(45) Date of Patent: Oct. 5, 2010

(54) VACUUM FILTRATION DEVICE

(75) Inventors: Chris A. Scott, Westford, MA (US); Matthew John Dunleavy, Billerica, MA (US); Louis Bonhomme, Waltham, MA (US)

(73) Assignee: Millipore Corporation, Billerica, MA (US)

( * ) Notice: Subject to any disclaimer, the term of this patent is extended or adjusted under 35 U.S.C. 154(b) by 310 days.

(21) Appl. No.: 10/770,052

(22) Filed: Feb. 2, 2004

(65) Prior Publication Data

US 2004/0188344 A1 Sep. 30, 2004

Related U.S. Application Data

(60) Provisional application No. 60/446,897, filed on Feb. 12, 2003, provisional application No. 60/523,264, filed on Nov. 19, 2003, provisional application No. 60/531,410, filed on Dec. 19, 2003.

(51) Int. Cl.
*B01D 29/92* (2006.01)
*B01D 35/00* (2006.01)
*B01D 35/01* (2006.01)

(52) U.S. Cl. ............ 210/406; 210/188; 210/482; 210/436; 210/474; 422/101

(58) Field of Classification Search ............ 210/406, 210/188, 482, 474, 436; 422/101
See application file for complete search history.

(56) References Cited

U.S. PATENT DOCUMENTS

| | | | | | |
|---|---|---|---|---|---|
| 2,379,101 | A | * | 6/1945 | Post ............... | 210/455 |
| 4,036,698 | A | * | 7/1977 | Bush et al. ......... | 435/31 |
| 4,251,366 | A | * | 2/1981 | Simon et al. ........ | 210/767 |
| 4,411,783 | A | * | 10/1983 | Dickens et al. ..... | 210/304 |
| 4,673,501 | A | * | 6/1987 | Wells et al. ........ | 210/406 |
| 4,806,135 | A | * | 2/1989 | Siposs ............ | 96/212 |
| 4,824,568 | A | | 4/1989 | Allegrezza et al. | |
| 4,919,802 | A | * | 4/1990 | Katsura ............ | 422/44 |
| 5,141,639 | A | | 8/1992 | Kraus et al. | |
| 5,725,763 | A | * | 3/1998 | Bonhomme et al. .. | 210/188 |
| 5,792,425 | A | | 8/1998 | Clark et al. | |
| 5,948,246 | A | | 9/1999 | Zuk, Jr. ........... | 210/188 |
| 6,176,904 | B1 | * | 1/2001 | Gupta ............. | 96/209 |

(Continued)

FOREIGN PATENT DOCUMENTS

CH 681861 6/1993

(Continued)

OTHER PUBLICATIONS

International Search Report, Jul. 26, 2004.

*Primary Examiner*—Thomas M Lithgow

(57) ABSTRACT

The present invention is a filter assembly for vacuum filtration formed of a housing having an upper portion and lower portion, a filter separating the upper from the lower portion of the housing, an inlet formed in the upper housing, an outlet and a vacuum port formed in the lower portion, a gasket arranged at a lowermost surface of the lower portion and the upper portion is having a height sufficient to trap any air that might enter and keep it away from the membrane surface. Preferably, it is of a curved shape, preferably in the form of a dome. Optionally, the upper portion of the housing may also contain a vent, particularly a vent controlled by a valve, for the removal of air periodically from the upper portion, especially when a large incursion of air has occurred.

16 Claims, 9 Drawing Sheets

U.S. PATENT DOCUMENTS

2002/0056675 A1 * 5/2002 Hegde .................. 210/188

FOREIGN PATENT DOCUMENTS

| EP | 321064 A1 | * | 6/1989 |
| EP | 0 815 915 | | 1/1998 |
| GB | 2140699 A | * | 12/1984 |
| WO | WO 00/47310 | | 8/2000 |
| WO | WO 0148141 A1 | * | 7/2001 |
| WO | WO 02/18037 | | 3/2002 |

* cited by examiner

VACUUM FILTRATION DEVICE

RELATED APPLICATIONS

This application claims the benefit of U.S. Provisional Application No. 60/446,897, filed Feb. 12, 2003, and U.S. Provisional Application No. 60/523,264, filed Nov. 19, 2003, and U.S. Provisional Application No. 60/531,410, filed Dec. 19, 2003.

The present invention relates to a device for vacuum driven filtration. More particularly, it relates to a closed device for vacuum driven sterile filtration.

BACKGROUND OF THE INVENTION

Several device designs have been made for filtering a feed liquid into a filtrate container. These are typically used to clarify and sterilize biological solutions, such as fetal calf serum, tissue culture media and the like. They may be an open device, meaning that their supply is open to the atmosphere or they may be a closed type of device in which the system is closed to the atmosphere. In an open device, the user must transfer the feed liquid from a storage vessel to the filter device, thus adding an added manual step to the process. Open filtration devices include the Stericup™ device available from Millipore Corporation of Billerica, Mass. which can handle a maximum unfiltered volume of 1 liter based on the size of the feeding funnel. The advantage of a closed filtration device is that it can process larger volumes continuously, as determined by the volume of the feed and filtrate storage vessels. Also, there is no manual transfer from the storage vessel to the closed filter assembly.

Closed devices generally include three components; a container for the unfiltered material, a container for the filtrate and a vacuum driven filter assembly between the two containers. In most of these systems, the first container is a flask or the package in which the unfiltered liquid is shipped (typically a bag or plastic bottle). The second (filtrate) container is a glass bottle or flask. The filter assembly is a separate essentially closed system having an inlet that is in fluid communication to the first container, typically by tubing, air-tightly sealed to the first container, a filter downstream of the inlet and an outlet downstream of the filter. The outlet is in fluid communication with the second container either directly or by a hose or tubing and is air-tightly sealed to the second container. A vacuum port is arranged downstream of the filter so as to draw the fluid from the first container, through the filter and into the second container.

The filter assembly typically has a gasket area designed to fit on top of the second container so as to establish a seal for the vacuum that drives the filtration process.

If, during operation, air should enter the closed filter assembly or if the feed is accidentally stopped, such as by the feed tube coming out of the feed liquid, filtration is stopped. Reestablishing the liquid flow can be difficult to achieve. Liquid flow will not be re-established until the wetted filter, closed to air bypass, can again be in contact with the unfiltered liquid stream.

Such devices have, in one instance, incorporated two filters, one hydrophilic to allow for the passage of liquid and one hydrophobic to allow for the passage of air. An alternative, as shown by U.S. Pat. Nos. 4,036,698 and 5,141,639, is to use a single membrane containing both hydrophilic areas and hydrophobic areas to allow for the passage of both air and liquid through different areas of the same membrane.

Both methods facilitate restarting the filtration by vacuum by allowing both air and liquid to pass simultaneously through the filter device.

These devices have several disadvantages.

First, the use of two membranes (one hydrophilic and the other hydrophobic) requires a unique design and sealing of two separate filters in place.

Likewise, the use of a hybrid membrane (part hydrophilic, part hydrophobic) is expensive and requires a determination of the proper balance of the respective philic/phobic areas. Too much phobic area reduces the filtration rate adversely. Likewise, too little phobic area makes restarting as difficult as if no phobic region existed.

Additionally, the phobic membrane or area is in contact with the fluid being filtered and will over time wet out or become clogged or fouled with contaminants or product such as proteins. This results in an irreversible air locking upon an air incursion as the phobic area no longer functions.

Both versions are difficult to integrity test with standard bubble point procedures due to the presence of the philic/phobic membranes at the same time.

Another problem with current closed filtration devices is that these devices are sensitive to small intrusions of air because the upper housing chamber is too small to hold any air away from the membrane, and therefore relies on the hybrid membrane to provide the sole means for evacuating trapped air. When the phobic vent is fouled as can occur with larger volume filtration, continuous filtration is over and the device must be replaced.

What is needed is a simpler closed filtration device for vacuum filtration. What is needed is a single closed filtration device that can process larger volumes of liquid from a feeding vessel without stopping under normal conditions due to air entrapment and can be purged of air in the event of stoppage to keep from having to discard and replace the device. Also desirable is a device that self seals to the filtrate container such that it can run unattended without stoppage due to a fouled phobic vent and small incursion of air.

SUMMARY OF THE INVENTION

The present invention is a filter assembly for vacuum filtration formed of a closed housing having an upper portion and lower portion, a filter separating the upper portion from the lower portion of the housing, an inlet formed in the upper housing, an outlet and a vacuum port formed in the lower portion, a gasket arranged at a lowermost surface of the lower portion and the upper portion of the housing has a cross sectional design of a height and volume sufficient to retain any air that may be introduced from the feed liquid and from within the filter assembly itself into the filter assembly, under normal operating conditions, without disrupting the vacuum flow. Preferably, the upper portion cross-sectional design is of a curved shape, preferably in the form of a dome, having a height and volume sufficient to trap any air that might enter from the system itself, including tubing and keep it away from the membrane surface. Optionally, the upper portion of the housing may also contain a vent, particularly a vent controlled by a mechanical, manual, or automatic valve, for the removal of air periodically from the upper portion, especially when a large incursion of air has occurred.

This invention allows one to maximize the effective filtration area of the device by eliminating the need for a hydrophobic membrane or portion in the active filtration area. It also prevents air from interfering with the vacuum filtration by trapping it away from the membrane surface and optionally, occasionally venting it. Moreover, it eliminates the problem of integrity testing which exists with the dual philic/phobic membrane systems.

It is an object of the present invention to provide a vacuum filter assembly for filtering a feed liquid into a filtrate container comprising a closed housing having an upper portion and a lower portion, an inlet formed in the upper portion of the housing, an outlet formed in the lower portion of the housing filter sealed in a liquid tight manner in the housing upstream of the outlet, a vacuum port in the lower portion of the housing downstream of the filter and located to communicate with an interior of the filtrate container to produce a vacuum within the filtrate container when the housing is attached to the filtrate containers and when the vacuum port is connected to a vacuum supply, the housing containing a gasket at its lower most surface for establishing a seal for the vacuum with the filtrate container, the filter being a microporous hydrophilic filter and the upper portion of the housing having a cross sectional design wherein the design is of a height and volume sufficient to retain any air that may be introduced from the feed liquid and from within the filter assembly itself into the filter assembly under normal operating conditions without disrupting the vacuum flow.

It is a further object of the present invention to provide a vacuum filter assembly for filtering a feed liquid into a filtrate container comprising a closed housing having an upper portion and a lower portion, an inlet formed in the upper portion of the housing, an outlet formed in the lower portion of the housing filter sealed in a liquid tight manner in the housing upstream of the outlet, a vacuum port in the lower portion of the housing downstream of the filter and located to communicate with an interior of the filtrate container to produce a vacuum within the filtrate container when the housing is attached to the filtrate containers and when the vacuum port is connected to a vacuum supply, the housing containing a gasket at its lowermost surface for establishing a seal for the vacuum with the filtrate container, the filter being a microporous hydrophilic filter and the upper portion of the housing having a cross sectional design wherein the design is of a height and volume sufficient to retain any air that may be introduced from the feed liquid into the filter assembly without disrupting the vacuum flow and the height (as measured from top surface of the filter to a highest point on an inner surface of the upper portion) of from about 0.05 to about 0.5 the diameter of the housing (as measured at the location of the filter).

It is an additional object of the present invention to provide a vent formed in the upper portion of the housing.

It is a further object to have the inlet at a height lower than the highest point in the upper portion of the housing.

It is a further object of the present invention to provide an inlet at a height lower than the highest point in the upper portion of the housing and a vent at a height greater than that of the inlet in the upper portion of the housing.

IN THE DRAWINGS

DETAILED DESCRIPTION OF THE INVENTION

Figure 1:
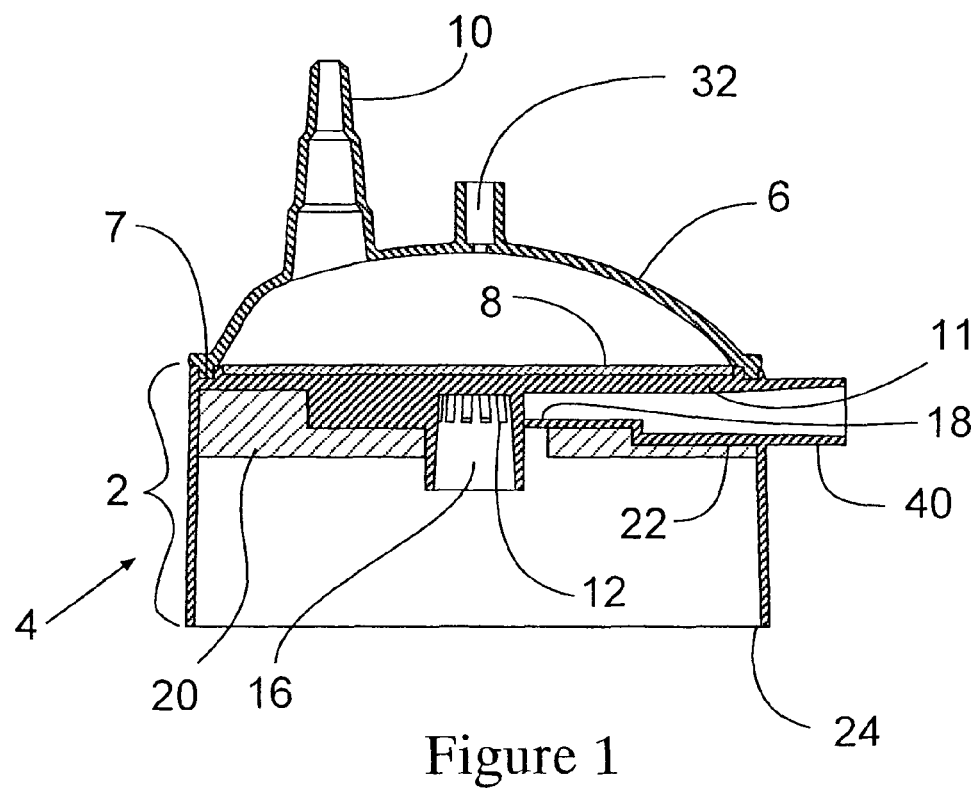
FIG. 1 shows a cross section of a first embodiment of the present invention.

The present invention is a device comprised of several major elements; a closed housing 2 formed of a lower portion 4 and an upper portion 6, a filter 8 which separates the upper portion 6 from the lower portion 4 in a liquid tight manner such that all fluid entering the lower portion 4 does so by passing through the filter 8 from the upper portion 6. The upper portion 6 is bonded to the lower portion 4 around their joining peripheries 7 so as to form an air tight, closed system for vacuum filtration. The portions can be joined by thermal bonding, ultrasonic welding, solvent bonding, adhesives, mechanical fits such as press-fits and snap-fits, and the like.

The upper portion 6 has an inlet 10 and the upper portion 6 has a cross sectional design of a height, shape and volume such that small volumes of air that may enter the upper portion 6 are retained within the upper regions of the upper portion 6 away from the membrane 8 so that vacuum filtration may continue uninterrupted.

This cross-sectional design can be of a curved design, i.e. in the form of a rounded or oval section or a dome, even up to a hemisphere. This design is shown in FIG. 1.

Figure 2:
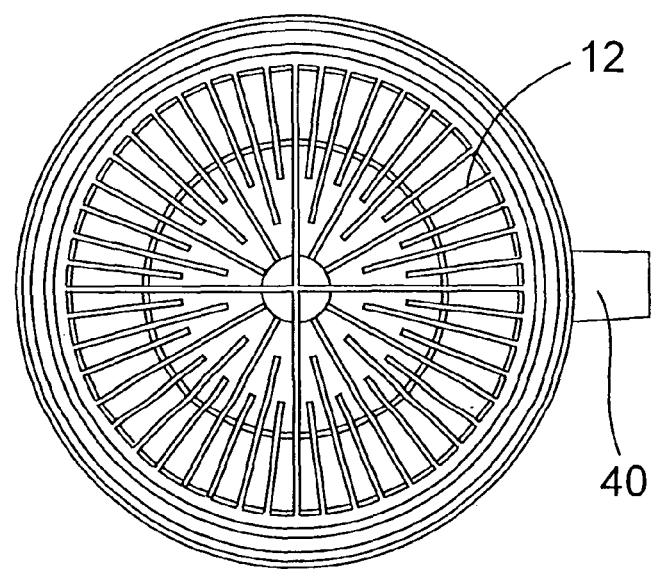
FIG. 2 shows a top down view of the upper surface of the lower portion of the device of FIG. 1.

The lower portion 4 has a filter 8 mounted to its upper surface 11. Preferably, there is a filter support 12 beneath the filter 8 such as a grid or macroporous plate as shown in FIG. 2. The support 12 is shaped in such a way as to help direct the filtrate to an outlet 16 formed in the lower portion 4 below the filter 8 so that no fluid is left behind. Those skilled in the art will recognize that the filter support mechanism can be a rib structure, a textured surface, grid, or any other means of creating a gap under the membrane to create fluid flow paths. Certain microporous membranes can also be run with a solid surface support as the gap is contained within the membrane structure itself. The filter and support structure need not be planar, it can consist of multiple angled planes, cones, cylinders, domes, etc. in order to maximize filtration area. Other options include stacked filter disks, such as Millidisk® filters available from Millipore Corporation of Billerica, Mass. to further maximize surface area.

The filter 8 may be bonded to the lower portion by adhesives, sonic welds, thermal bonding and the like. Those skilled in the art will appreciate that one could bond the filter to the upper housing in a similar manner. One could also create a single piece unit consisting of the upper and lower chambers and the filter with a two-shot molding technique. One could also capture the filter media between the two housings without any bonding by means of mechanical capture sealing. Such methods of sealing filters to a device are all well known and the appropriate one is based upon the filter 8 and lower portion 4 materials of construction and the ability to obtain a liquid tight seal between the filter 8 and the lower portion 4 so that all fluid entering the outlet must do so by having first passed through the filter 8. Preferably, this outlet 16 is centrally located. A vacuum port 18 is also contained within the lower portion 4 so that it may draw air out of the filtrate container 30 (shown in FIG. 3) and device to create the vacuum filtration flow. Preferably, the vacuum port 18 is arranged adjacent the outlet 16 when the outlet 16 is centrally located. As shown in FIG. 1, the port 18 is arranged adjacent the centrally located outlet 16. Alternatively, the vacuum port 18 may be arranged concentrically around the outlet 16 (not shown).

A large sealing surface 20 is formed on a lower surface 22 of the lower portion 4 for creating an air-tight seal with the filtrate container. Preferably, it extends from the outer edges of the outlet 16 and port 18 and extends at least close to the outer periphery 24 of the lower portion 4. Alternatively, it may extend all the way to the outer periphery 24 if desired. This provides a wide area for sealing and establishing a vacuum with filtrate containers of various mouth diameters. It is desirable to have the sealing be of a self-sealing type, meaning it will seal under its own weight, with minimal additional force required. As such, one could use a common lab stand to hold the device suspended over the filtrate vessel and run the experiment unattended.

Figure 3:
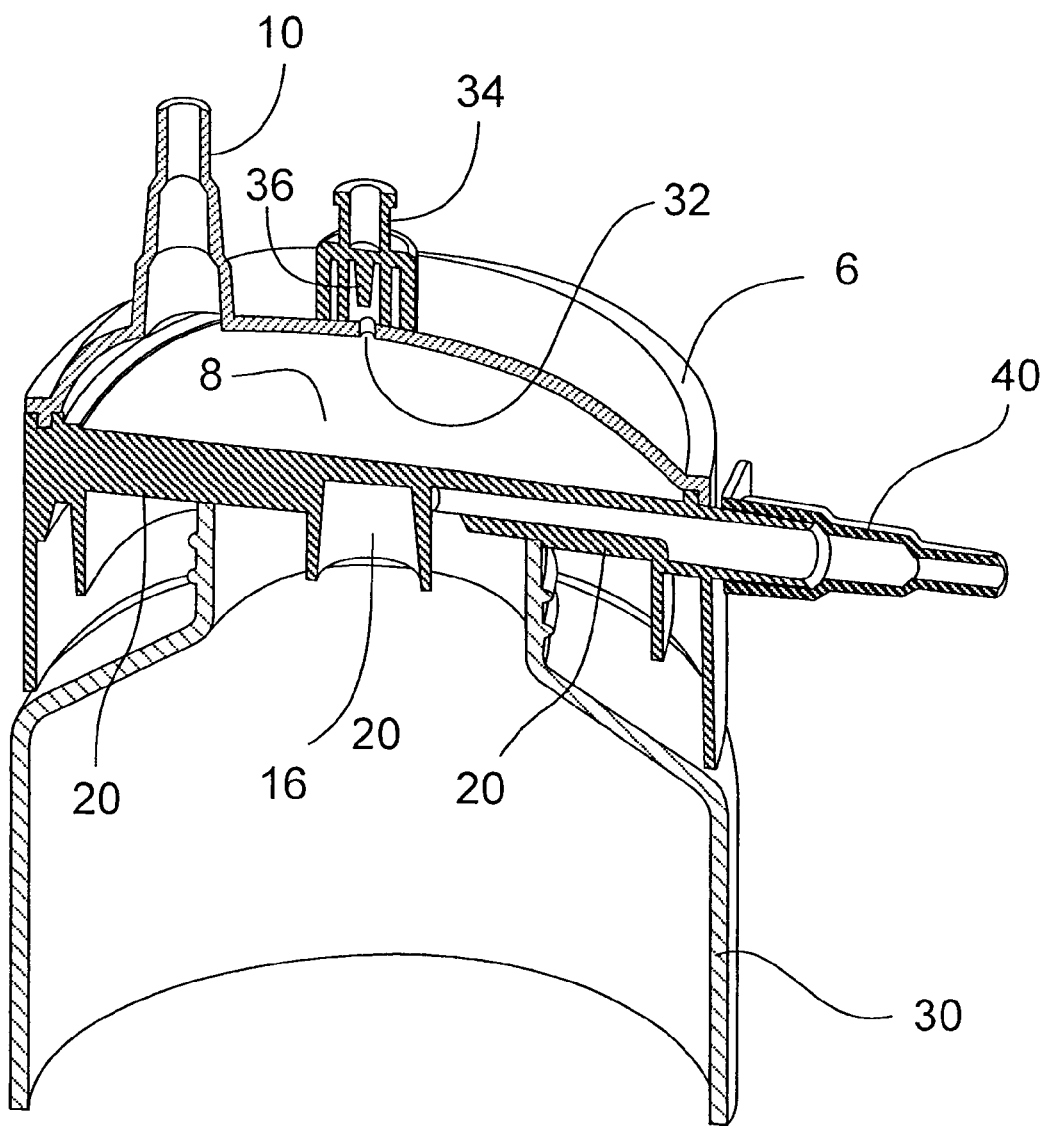
FIG. 3 shows a cut-away view of a device according FIG. 1 mounted on a filtrate container.

FIG. 3 shows a cut away cross sectional view of the device of FIG. 1 mounted to a filtrate container 30. An optional feature is the vent 32 as shown in FIGS. 1 and 3. As shown in FIG. 3 the vent may be covered by a valve to selectively close and open the vent as needed. The valve may be a mechanical, manual, or automatic valve. A rubber plug or a piece of adhesive tape or other devices to temporarily close off a port (not shown) may be used in lieu of the valve 34. As shown in FIG. 3, the valve 34 has internal threads that mate to external threads on the vent 32. It also contains a plug 36 that extends into the vent 32. It blocks off airflow into the vent when the valve is fully screwed on to the vent 32. As the valve 34 is unscrewed, the plug 36 unseats and provides a varying amount of flow depending on how open the vent 32 is made. Those skilled in the art will recognize that the vent need not be threaded, but can be a luer-lock, snap fit, or other mechanical means of opening and closing.

Figure 4:
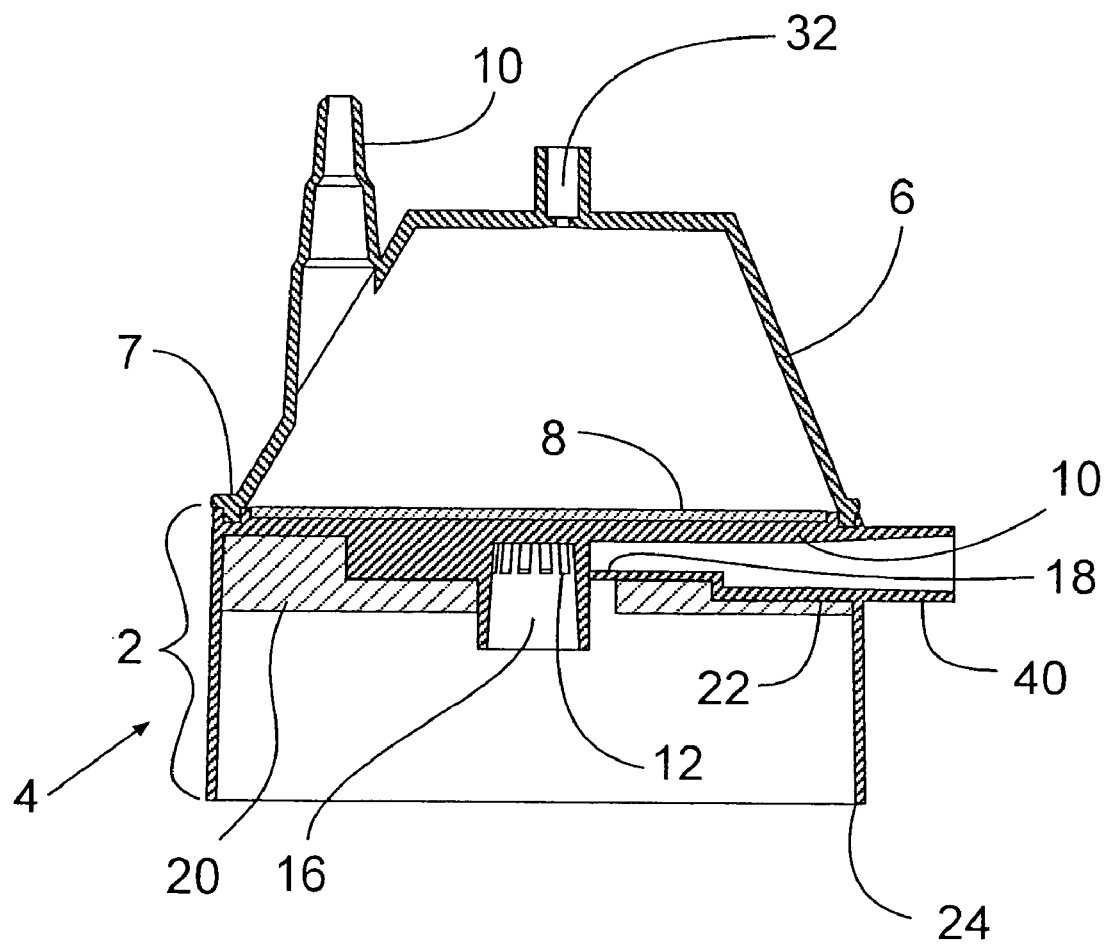
FIG. 4 shows an alternative embodiment to the present invention in cross sectional view.

FIG. 4 shows an alternative design to the upper portion. In this embodiment, the upper portion is relatively linear such as in the form of a polygon such as a square with four flat surfaces merging into a flat or if desired, rounded top (not shown).

Figure 5:
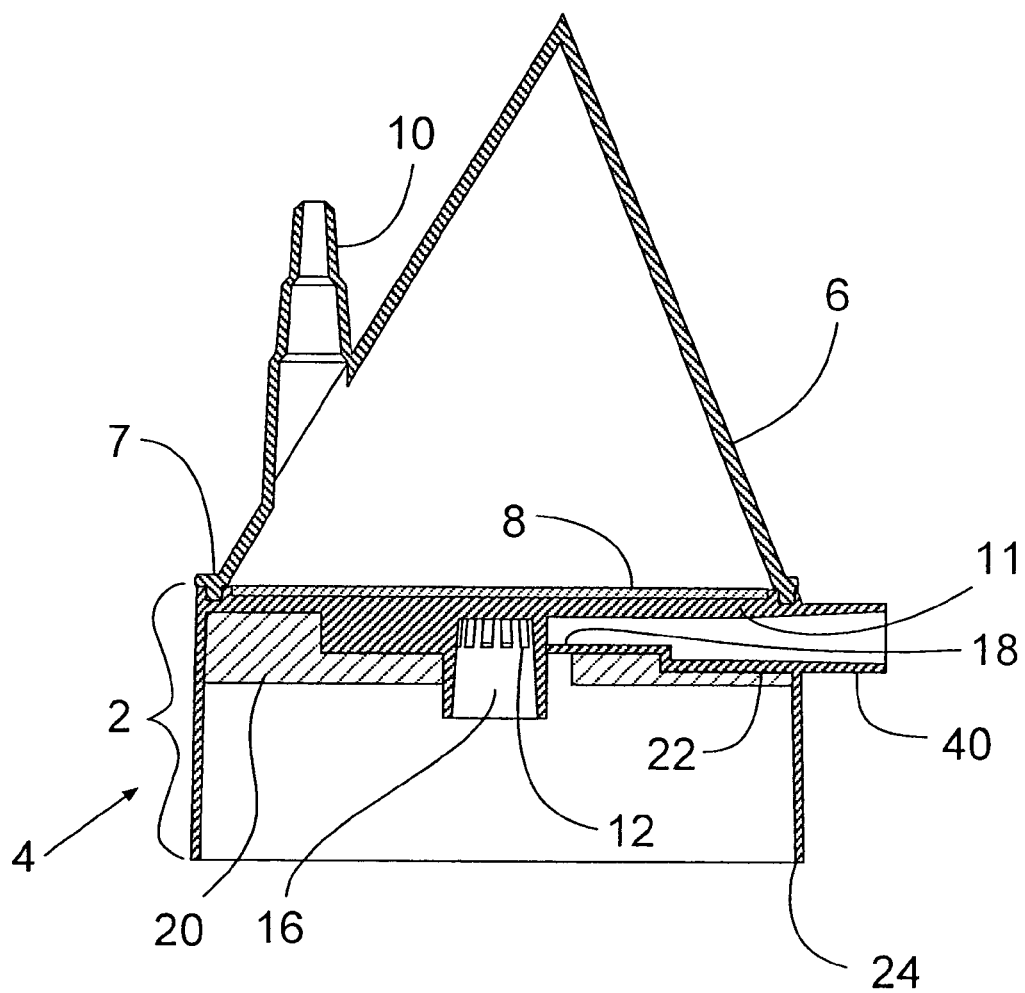
FIG. 5 shows a further alternative embodiment to the present invention in cross sectional view.

FIG. 5 shows a linear embodiment similar to that of FIG. 4 carried to the extreme. Here the sides all merge into a pyramidal shape.

Figure 6:
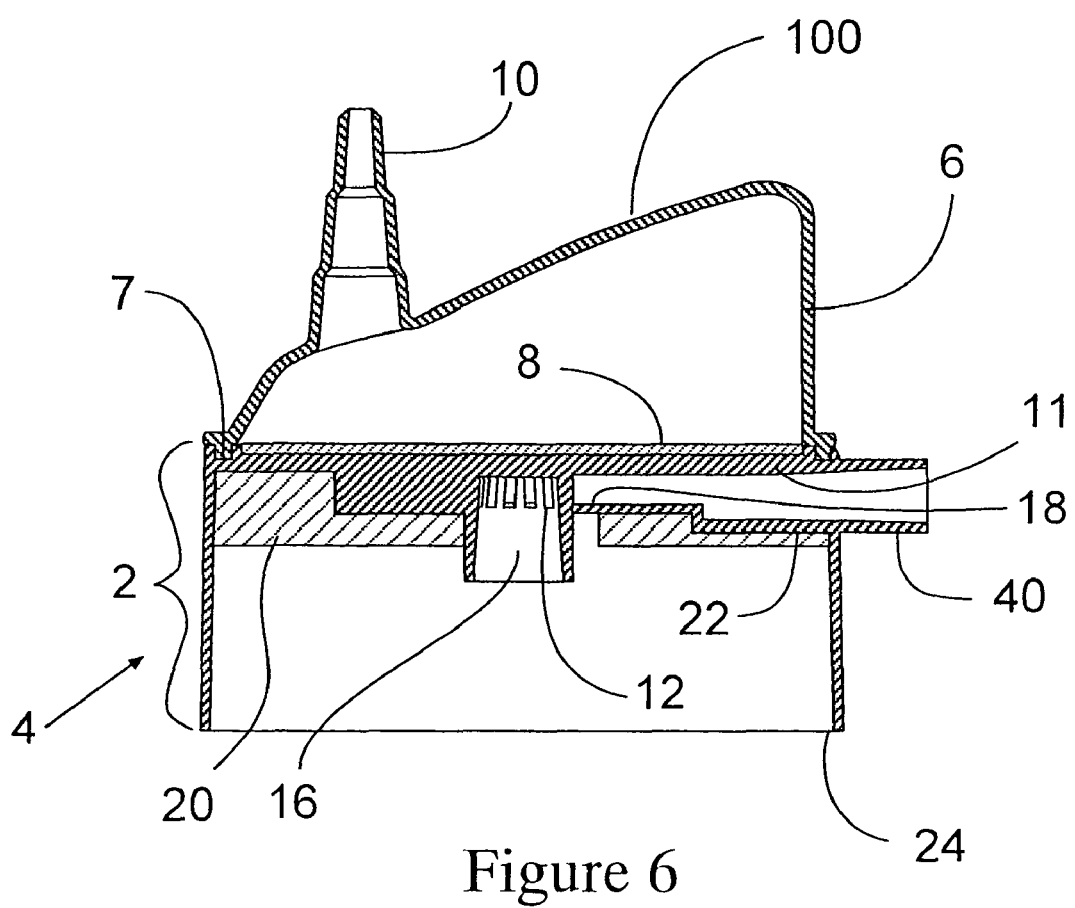
FIG. 6 shows a further alternative embodiment to the present invention in cross sectional view.

FIG. 6 shows another embodiment in which the upper portion tapers upwardly from one side to the other as shown by reference number 100. In this embodiment as shown, the optional vent is not used although if desired it can be added.

Figure 7:
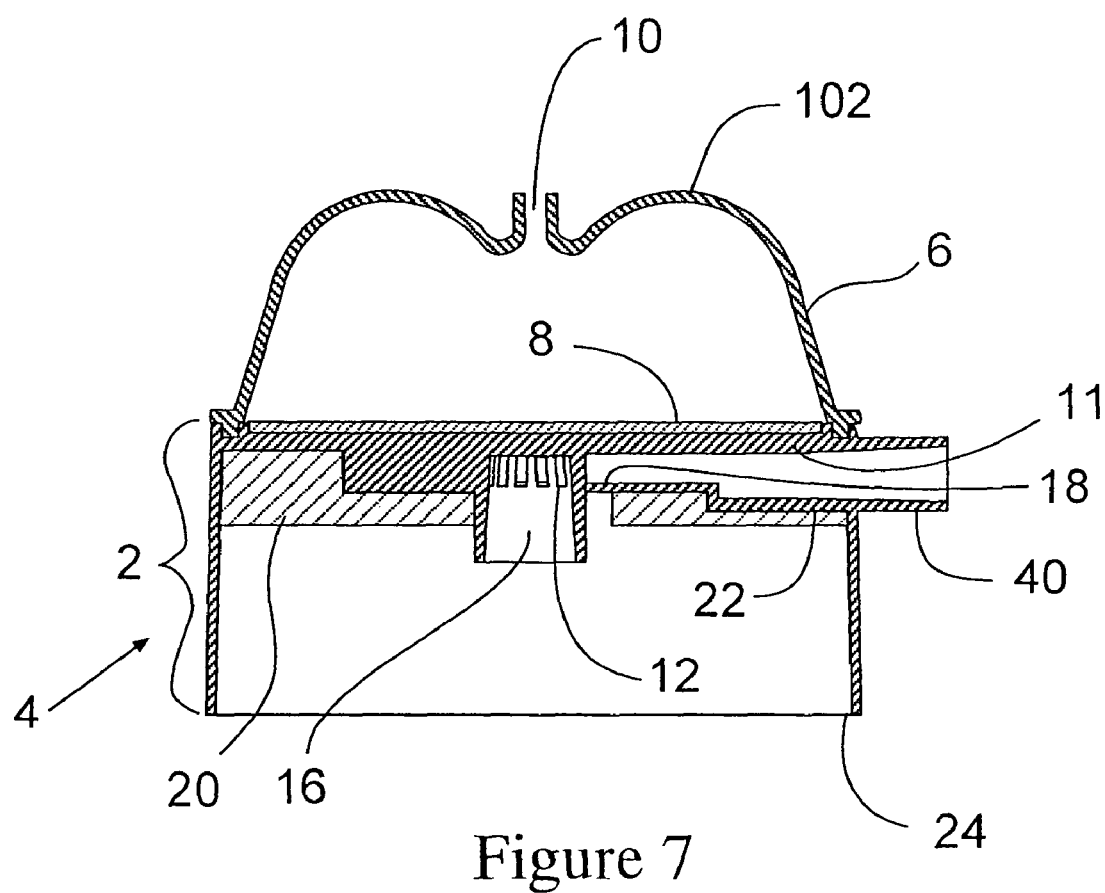
FIG. 7 shows a further alternative embodiment to the present invention in cross sectional view.

FIG. 7 shows another embodiment in which the inlet 10 is centrally located and the upper portion tapers upwardly from the inlet toward the outer edge as shown by reference number 102. In this embodiment as shown, the optional vent is not used although if desired it can be added.

Figure 8:
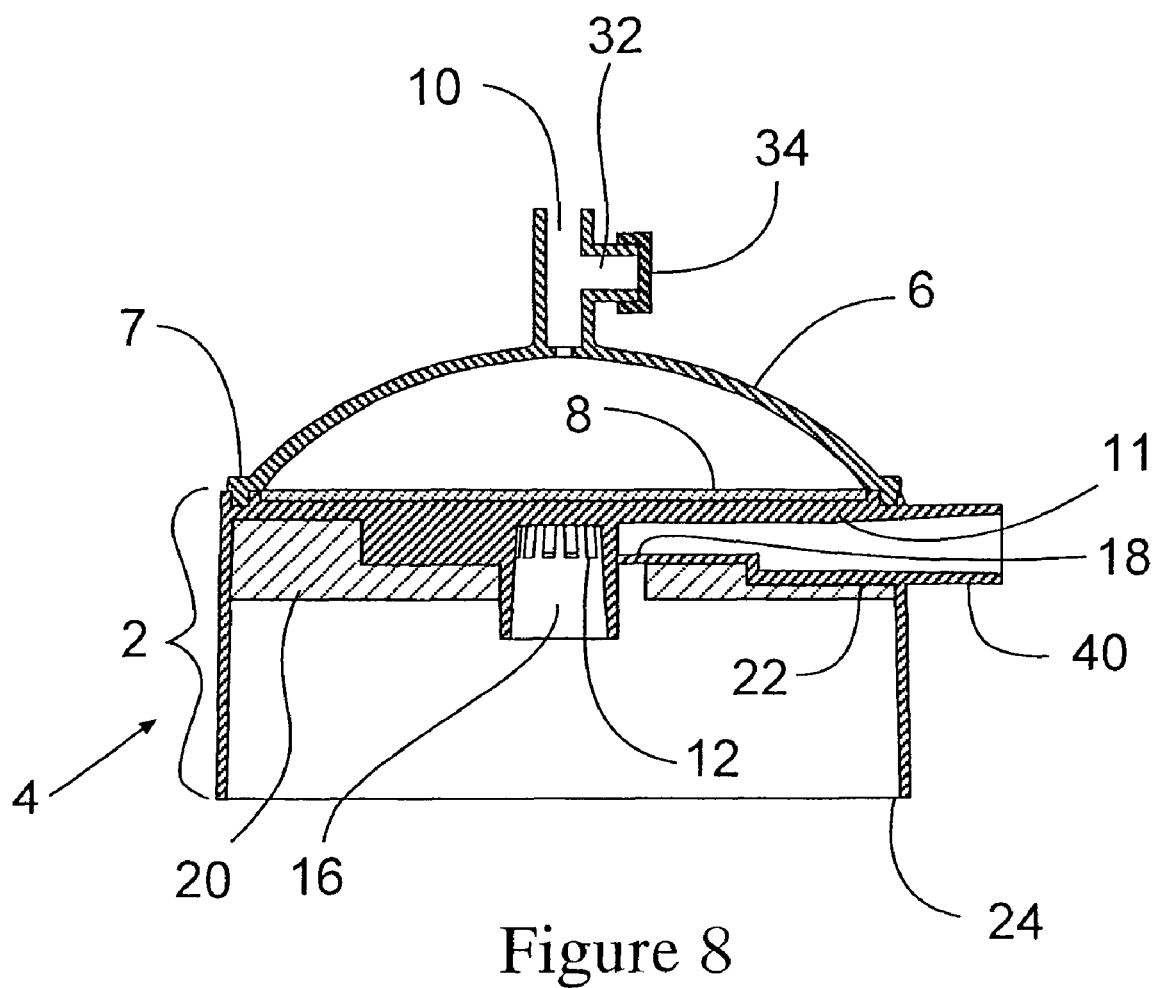
FIG. 8 shows a further alternative embodiment to the present invention in cross sectional view.

FIG. 8 shows a further embodiment of the present invention in which the inlet 10 is centrally located and the vent 32 is formed on the inlet 10 as a branch off of the inlet 10. A preferred vent device is that described in regard to FIG. 3 and uses the valve 34.

Figure 9:
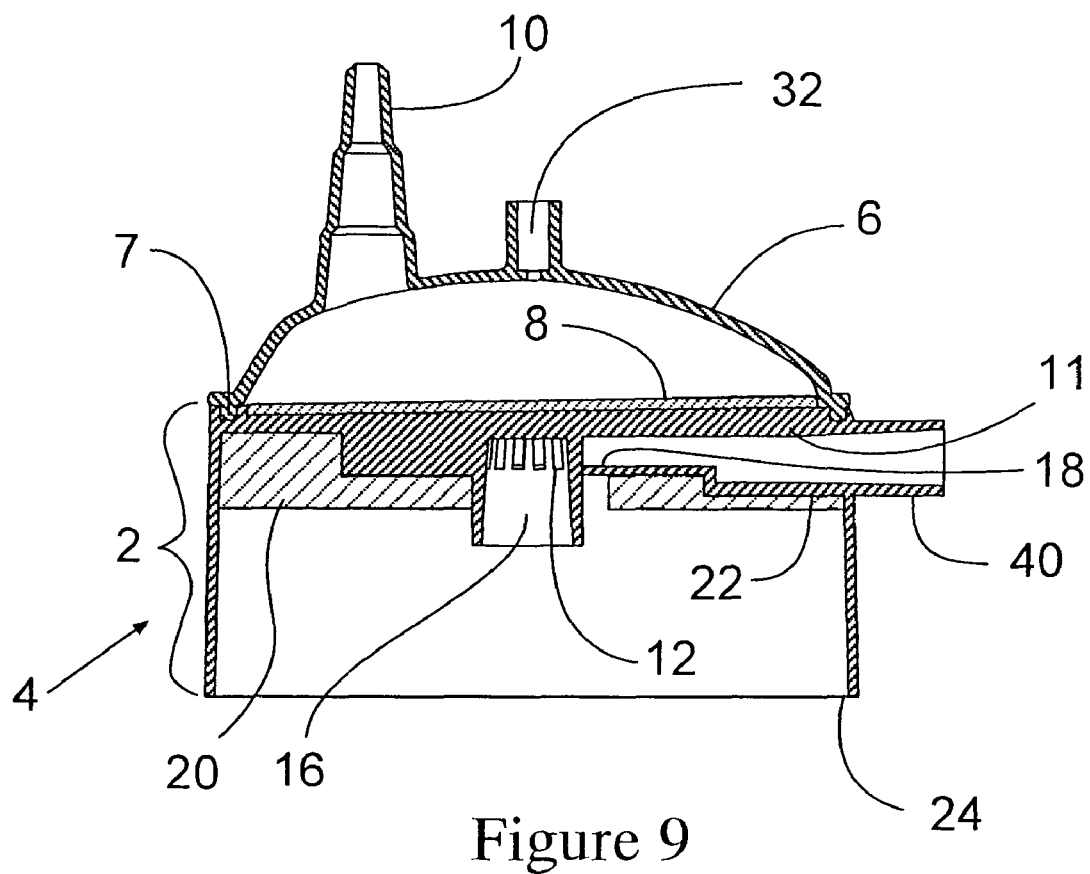
FIG. 9 shows a further alternative embodiment to the present invention in cross sectional view.

FIG. 9 shows a self-priming embodiment of the present invention. In this embodiment, the membrane support surface 11 of the lower portion 4 is tapered so that its low point is adjacent the inlet 10. As the system is first activated, the fluid rushes in to the area adjacent the inlet and then begins to flow upward along the angled membrane 8. Any air is either carried through the dry membrane portion and/or displaced up the face of the membrane 8 and then to the space in the upper chamber. Other means of self priming are included, such as isolating a portion of the membrane from the liquid flow path during normal operation, thus keeping it dry, only to reveal it to the upper chamber in the presence of an air lock via triggering mechanism such as a simple plug or valve.

The upper portion should be of a shape and contain a space sufficient to trap any air that may enter the upper portion to the upper regions of the upper portion away from the filter. In this way, the filtration is allowed to continue unimpeded. Preferably, the upper portion of the device has a height (as measured from top surface of the filter to a highest point on an inner surface of the upper portion) of from about 0.05 to about 0.5× the diameter of the housing (as measured at the location of the upper portion adjacent the filter). More preferably, it is from about 0.1 to about 0.3×the diameter. Also while the embodiments show the upper portion to be symmetric, it need not be so and may have one portion of a greater scale and height than the rest, provided adequate air storage space is maintained. For most applications, a volume of from about 20 to about 200 ccs is sufficient air storage space. The amount chosen depends on the amount of fluid to filter and the typical amount of air encountered in such applications. An additional consideration is the amount of total space one wishes to have in the upper chamber. Typically, it is preferred to have as little space as is required to make the device work so as to limit any holdup volume that might otherwise be lost.

The inlet is also preferably spaced apart from the vent to prevent any crosstalk or contamination. If they are located closely together the use of a barrier such as an extension of device material may be made between them so there is no direct flow or access from one to other. Also the inlet is preferably located at a height lower on the upper portion than the vent. The vent is preferably located at the highest point of the upper portion.

The sealing surface 20 may be formed of a gasket such as of natural or synthetic rubber, polymers such as silicones, EPDM polymers and styrene butadiene block copolymers, thermoplastic elastomers such as Santoprene® resins, foamed closed cell materials such as polyurethanes and foamed polypropylene and the like. The sealing surface can be attached to the device via frictional fits, mechanical capture, adhesives, and over-molding.

The material used to create the device 2 may be any of those commonly used in making such devices including a styrene acrylonitrile polymer (SAN), polyolefins including but limited to polyethylene, polypropylene, polybutylenes, polyisoprenes and their copolymers, polycarbonates, polystyrenes, other styrene homopolymers and copolymers, PTFE resins, blends of polyolefins with small amounts of PTFE resins to reduce protein binding, ABS resin, acrylic resins, methacrylic resins and copolymers of either, polyamides such as nylons, epoxies, polyurethanes and reinforced resins such as glass filled epoxy resins, and other such materials commonly used to make such devices, with or without fillers, pigments, etc as may be desired or required by the intended end use of the device.

Suitable filters are microporous filters preferably those having a nominal pore size of from about 0.1 to about 0.22 microns so that they provide a sterilizing effect (removal of bacteria) to the filtrate. Such filters can be made of materials selected from the group consisting of nitrocellulose, cellulose acetate, polysulphones including polyethersulphones, polyphenylsulphones and polyarylsulphones, polyvinylidene fluoride, polyolefins such as polyethylenes, polypropylenes, polybutylenes, polyisoprenes and more particularly ultrahigh molecular weight polyethylenes, low density polyethylenes and polypropylenes, polyamides such as nylons, PTFE resin, thermoplastic fluorinated polymers such as poly (TFE-co- PFAVE), e.g. PFA, polycarbonates or particle filled membranes such as EMPORE® membranes available from 3M of Minneapolis, Minn. Metal filters can be made of stainless steel, nickel or chromium such as the SF sintered stainless steel filter or the NF sintered nickel filter available from Mykrolis Corporation of Billerica, Mass.

All of these filters are well known in the art, may be symmetrical or asymmetrical or a combination of the two (e.g. one portion being symmetrical or isotropic and the rest being asymmetrical), composite (either co-cast with at least a second layer or cast on to a separate preformed membrane support layer), may be in the form of mats, flat sheets, made as meshes or woven and non-wovens and are commercially available from a variety of sources including DURAPORE® membranes (symmetric PVDF) and EXPRESS® membranes (asymmetric PES membranes) and EXPRESS® PLUS membranes (asymmetric composite PES membranes) available from Millipore Corporation of Billerica, Mass.

These filters may contain a philic or phobic coating as is well known in the art, See U.S. Pat. No. 4,944,879. Preferably, they contain a philic coating for applications as typically envisioned such a media filtration and the like.

Preferred membranes are asymmetric philic membranes such as the EXPRESS® membranes (asymmetric PES membranes) and EXPRESS® PLUS membranes (asymmetric composite PES membranes) available from Millipore Corporation of Billerica, Mass. as they provide fast flow with good sterile filtration.

As shown in FIGS. 1 and 3, the vent 32 is preferably located at the highest point in the upper portion 6 of the device. The inlet 10 is preferably set apart from the vent 32 by a small distance to avoid any potential cross talk or contamination when both are in use.

Optionally, the vent 32 and the vacuum port 18 may contain a hydrophobic porous material (not shown) to prevent the escape of any liquid through them. Useful materials include but are not limited to PTFE membranes, hydrophobically coated membranes and the like. See U.S. Pat. Nos. 5,792,425 and 5,141,639.

Figure 10A:
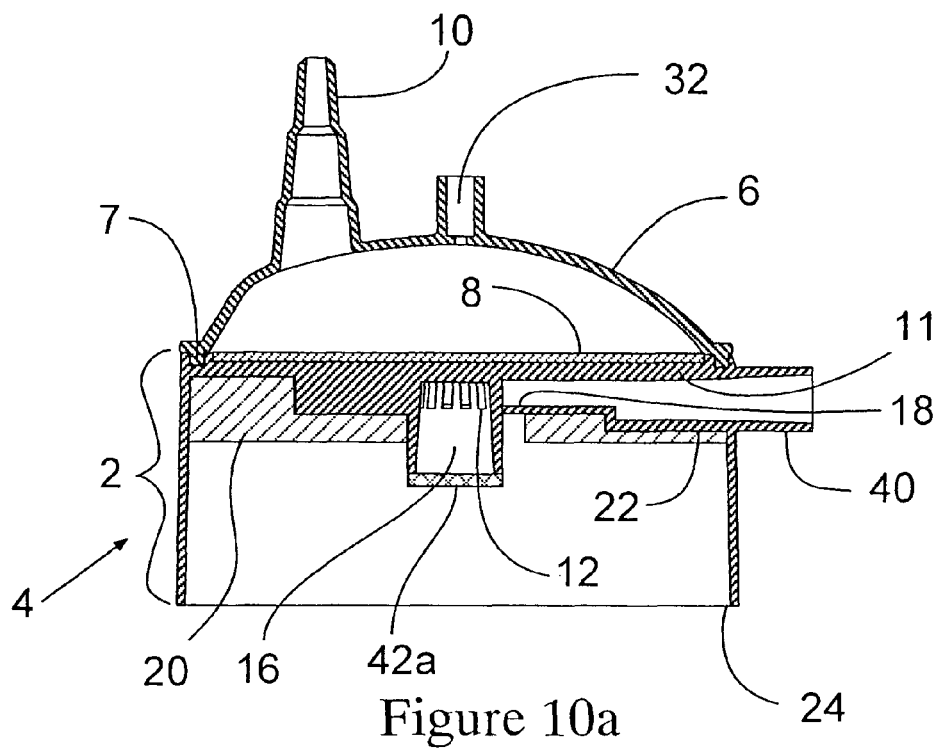
FIGS. 10A and 10B show further alternative embodiments to the present invention in cross sectional view.
Figure 10B:
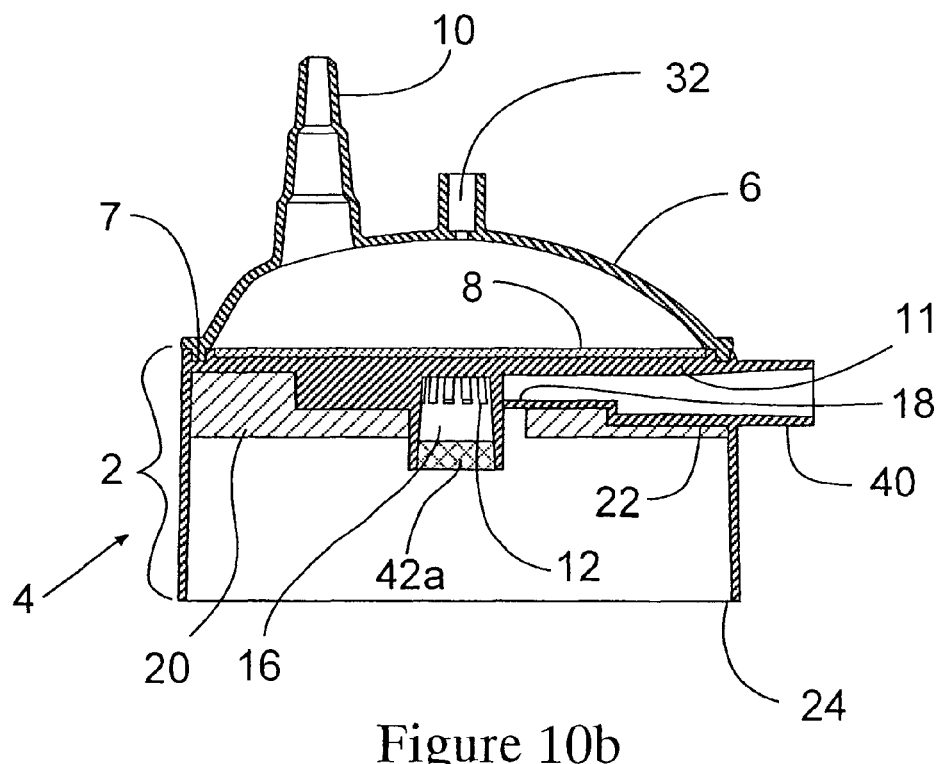

In a further embodiment, a hydrophobic porous element may be used adjacent the outlet 16 to prevent drippage of the fluid in the device during container to container transfers. This may occur especially if the device is tilted during that transfer operation. One can use a hydrophobic membrane or filter 42A across the bottom outlet 16 as shown in FIG. 10A or one can use a porous hydrophobic frit 42B within the outlet 16 as shown in FIG. 10B. A low surface energy or hydrophobic material holds the fluid in the outlet when no vacuum is applied. Upon the application of a vacuum (15-30 inches of Hg is typical), the vacuum force overcomes the resistance of the fluid to flow through the material and allows it flow out the outlet 16 in to a container for further use.

The membrane or filter may be an inherently hydrophobic material such as PTFE, polyethylene or polysulfone. Alternatively, it may be either hydrophobic or hydrophilic material that contains a low surface energy or hydrophobic coating. See U.S. Pat. No. 4,824,568 that teaches casting a polymeric coating onto a membrane's surface and then cross-linking it in place with UV light, electron beam or another energy source to apply a hydrophobic coating to a membrane such as PVDF, polyethersulfone, polysulfone, nylons, PTFE resin, polyethylene and the like.

Other technologies such as polymerizing and crosslinking hydrophobic or super-hydrophobic coatings or grafting hydrophobic materials onto the membrane surface can also be used.

Preferably, the membranes have a pore size of from about 0.22 microns to about 10 microns. Such membranes are available from Millipore Corporation of Billerica, Mass., under the brand names of Fluopore™ and Mitex™ PTFE membranes, or from Whatman of Kent, England or W. L. Gore and Associates and are typically made of PTFE resin and other fluoropolymer materials that are inherently hydrophobic.

It may also be in the form of a porous frit, such as POREX™ frits available by Porex Product Group of Fairburn, Ga. that comes in variety of average pore sizes from about 35 microns to about 350 microns. One such material is the Porex 4105 polypropylene frit (150 micron pore size).

In either form, they may be secured to the outlet by heat bonding, sonic welding, adhesives or friction fit.

In operation, the inlet 10 is coupled to a supply of fluid to be filtered by a hose. This is typically a flask or the shipping container for the fluid. If it is a flask, the flask has a hose extended through a hole in a rubber plug that seals the flask airtight. The device 2 is placed on top of a filtrate container 30 such as that of FIG. 3. The outlet 16 is generally centered over the opening of the container 30 and an airtight seal is established between the container 30 and the device 2 by the sealing area 20. A supply of vacuum is coupled to the vacuum port 18, again typically by a hose connection to the connection point 40 of the vacuum port 18.

After these connections are made, the vacuum is turned on, evacuating the air from the filtrate container and drawing fluid from the supply through the hose to the inlet 10 of the device 2. Fluid is then pulled by the vacuum through the filter 8 and into the filtrate container 30. Any bacteria or other particulate material larger than the filter pore size is trapped on or in the filter 8 and does not enter the filtrate container 30. When the desired amount of filtrate has been placed within the container 30, the system either is stopped or the device 2 is moved to another filtrate container 30 to fill it. The vacuum may or may not be stopped between the switching of filtrate containers 30 as desired.

If air should enter the device 2, it is trapped within the upper regions 50 of the upper portion 6 so that filtration will continue unimpeded. Typically, the volume for the air within the upper regions 50 is sufficient so that the air never is a factor in the filtration process. If the level of air within the upper regions 50 becomes large enough so that it might impede filtration, one can stop the vacuum and withdraw the air through the vent 32, if used, either by a vacuum line or by a syringe and the like. Once the air has been removed, the vacuum can be reestablished and filtration can continue.

If air should reach the membrane and compromise the vacuum filtration process, one can stop the vacuum, evacuate the air from the upper portion of the device again by vacuum or the like through the vent 32 and then reestablish the vacuum and filtration process.

We claim:

1. A vacuum filter assembly for filtering a feed liquid into a filtrate container consisting essentially of a closed housing having an upper portion and a lower portion, the upper portion of the housing having a cross sectional design selected from the group consisting of curves and domes wherein the design is of a height and volume sufficient to retain any air that may be introduced from the feed liquid into the housing without disrupting the vacuum flow, a vertically oriented inlet formed in the upper portion of the housing such that liquid enters the housing in a vertically downward direction and wherein the inlet is formed in the upper portion at a height lower than the highest point of the upper portion of the housing, an outlet formed in the lower portion of the housing, a filter sealed in a liquid tight manner in the housing upstream of the outlet wherein the filter in the housing upstream of the outlet consists only of a hydrophilic, microporous filter, a vacuum port in the lower portion of the housing downstream of the filter and located to communicate with an interior of the filtrate container to produce a vacuum within the filtrate container when the housing is attached to the filtrate container and when the vacuum port is connected to a vacuum supply, wherein the outlet and vacuum port are separate and located adjacent each other and the housing containing a gasket at its lower most surface for establishing a seal for the vacuum with the filtrate container.

2. The device of claim 1 wherein the membrane support surface is at an angle relative the device centerline.

3. The device of claim 1 wherein the design is a dome.

4. The device of claim 1 wherein the design is curved and the curve is equal to or less than a hemispherical configuration.

5. The device of claim 1 further comprising a porous filter support formed in the housing downstream of and in contact with an undersurface of the filter.

6. The device of claim 1 wherein the outlet extends downward below the lowermost surface of the housing.

7. The device of claim 1 further comprising a vent selectively closed by a valve located at a height above the inlet in the upper portion of the housing.

8. The device of claim 1 wherein the upper portion has a height (as measured from top surface of the filter to a highest point on an inner surface of the upper portion) of from about 0.05 to about 0.5× the diameter of the housing (as measured at the location of the filter).

9. The device of claim 1 wherein the upper portion has a height (as measured from top surface of the filter to a highest point on an inner surface of the upper portion) of from about 0.1 to about 0.3× the diameter of the housing (as measured at the location of the filter).

10. The device of claim 1 wherein the upper portion cross-sectional design is a curved design.

11. The device of claim 1 wherein the gasket is formed from an outer edge of the housing to the outer edge of the outlet and port.

12. The device of claim 1 wherein the outlet and vacuum port are located concentrically to each other with the vacuum port surrounding the outlet.

13. The device of claim 1 further comprising a vent formed at the highest point of the upper portion of the housing.

14. The device of claim 13 wherein the upper housing is in communication with the vacuum source and an on/off switch.

15. A vacuum filter assembly for filtering a feed liquid into a filtrate container consisting essentially of a closed housing having an upper portion and a lower portion, the upper portion of the housing having a curved cross sectional design wherein the upper portion has a height (as measured from top surface of the filter to a highest point on an inner surface of the upper portion) of from about 0.05 to about 0.5× the diameter of the housing (as measured at the location of the filter) so as to retain any air that may be introduced from the feed liquid into the feed assembly without disrupting the vacuum flow, a vertically oriented inlet formed in the upper portion of the housing such that liquid enters the housing in a vertically downward direction and wherein the inlet is formed in the upper portion at a height lower than the highest point of the upper portion of the housing, an outlet formed in the lower portion of the housing, a microporous hydrophilic filter in a liquid tight manner in the housing upstream of the outlet, a vacuum port in the lower portion of the housing downstream of the filter and located to communicate with an interior of the filtrate container to produce a vacuum within the filtrate container when the housing is attached to the filtrate container and when the vacuum port is connected to a vacuum supply, wherein the outlet and vacuum port are separate and located adjacent each other and the housing containing a gasket at its lower most surface for establishing a seal for the vacuum with the filtrate container.

16. A vacuum filter assembly for filtering a feed liquid into a filtrate container consisting essentially of a closed housing having an upper portion and a lower portion, the upper portion of the housing having a cross sectional design wherein the design is curved and the curve is equal to or less than a hemispherical configuration and the upper portion has a height (as measured from top surface of the filter to a highest point on an inner surface of the upper portion) of from about 0.1 to about 0.3× the diameter of the housing (as measured at the location of the filter) so as to retain any air that may be introduced from the feed liquid into the filter assembly without disrupting the vacuum flow, a vertically oriented inlet formed in the upper portion of the housing such that liquid enters the housing in a vertically downward direction and wherein the inlet is formed in the upper portion at a height lower than the highest point of the upper portion of the housing, an outlet formed in the lower portion of the housing, a microporous hydrophilic filter in a liquid tight manner in the housing upstream of the outlet, a vacuum port in the lower portion of the housing downstream of the filter and located to communicate with an interior of the filtrate container to produce a vacuum within the filtrate container when the housing is attached to the filtrate container and when the vacuum port is connected to a vacuum supply, wherein the outlet and vacuum port are separate and located adjacent each other and the housing containing a gasket at its lower most surface for establishing a seal for the vacuum with the filtrate container.

* * * * *